US012779535B2

(12) United States Patent
Yahagi et al.

(10) Patent No.: US 12,779,535 B2
(45) Date of Patent: Nov. 3, 2026

(54) METHOD FOR MANUFACTURING ADDITIVELY MANUFACTURED OBJECT

(71) Applicants: Soichiro Yahagi, Toyota (JP); Tomoya Yamazaki, Toyota (JP); Kenji Yokoyama, Chigasaki (JP)

(72) Inventors: Soichiro Yahagi, Toyota (JP); Tomoya Yamazaki, Toyota (JP); Kenji Yokoyama, Chigasaki (JP)

(73) Assignees: TOYOTA JIDOSHA KABUSHIKI KAISHA, Toyota (JP); ExOne KK, Odawara (JP)

( * ) Notice: Subject to any disclaimer, the term of this patent is extended or adjusted under 35 U.S.C. 154(b) by 440 days.

(21) Appl. No.: 18/188,962

(22) Filed: Mar. 23, 2023

(65) Prior Publication Data

US 2023/0302537 A1 Sep. 28, 2023

(30) Foreign Application Priority Data

Mar. 28, 2022 (JP) ................................ 2022-051280

(51) Int. Cl.
*B22F 10/14* (2021.01)
*B22F 10/68* (2021.01)
*B33Y 10/00* (2015.01)
*B33Y 40/20* (2020.01)

(52) U.S. Cl.
CPC .............. *B22F 10/14* (2021.01); *B22F 10/68* (2021.01); *B33Y 10/00* (2014.12); *B33Y 40/20* (2020.01)

(58) Field of Classification Search
CPC ....................................................... B22F 10/14
See application file for complete search history.

(56) References Cited

U.S. PATENT DOCUMENTS

| | | | | |
|---|---|---|---|---|
| 2010/0038012 | A1* | 2/2010 | Tucker | B22F 7/062 138/143 |
| 2010/0043944 | A1* | 2/2010 | Jensen | B23K 20/023 156/89.27 |
| 2018/0001384 | A1* | 1/2018 | Manteiga | B22F 10/20 |
| 2019/0337056 | A1* | 11/2019 | El Naga | B29C 64/35 |
| 2021/0299751 | A1 | 9/2021 | Mega et al. | |
| 2021/0387257 | A1* | 12/2021 | Shuck | F16B 17/006 |
| 2022/0032501 | A1* | 2/2022 | Aoki | B28B 7/18 |
| 2022/0105563 | A1* | 4/2022 | Cornell | B33Y 40/20 |

FOREIGN PATENT DOCUMENTS

| | | | |
|---|---|---|---|
| JP | 2000-024756 | A | 1/2000 |
| JP | 2020-76124 | A | 5/2020 |
| JP | 2021-161460 | A | 10/2021 |

* cited by examiner

*Primary Examiner* — Christopher S Kessler
(74) *Attorney, Agent, or Firm* — Sughrue Mion, PLLC

(57) ABSTRACT

The method for manufacturing an additively manufactured object includes: forming a precursor having an opening portion that communicates with an internal space, by jetting a liquid binder onto a powder layer to form solidified layers and stacking the formed solidified layers; forming a plug configured to be assembled with the opening portion; removing unsolidified powder remaining in the internal space from the opening portion; applying the liquid binder to an outer peripheral wall of the plug after removing the unsolidified powder; assembling the plug with the opening portion such that the outer peripheral wall of the plug comes into contact with an inner peripheral wall of the opening portion; and sintering the precursor having the plug assembled with the opening portion.

4 Claims, 5 Drawing Sheets

METHOD FOR MANUFACTURING ADDITIVELY MANUFACTURED OBJECT

CROSS REFERENCE TO RELATED APPLICATIONS

The present application claims priority from Japanese patent application JP 2022-051280 filed on Mar. 28, 2022, the entire content of which is hereby incorporated by reference into this application.

BACKGROUND

Technical Field

The present disclosure relates to a method for manufacturing an additively manufactured object.

Background Art

In recent years, a method for manufacturing an additively manufactured object, including jetting a liquid binder onto a powder layer to form solidified layers and stacking the formed solidified layers together so as to manufacture a three-dimensional object, has been used. JP 2021-161460 A describes a method for manufacturing an additively manufactured object, including a step of forming a fabricated object by layering metal powder, the fabricated object including an opening portion that communicates with a hollow internal space; a step of discharging the metal powder remaining in the internal space from the opening portion after forming the fabricated object; a step of mounting a plug in the opening portion; and a step of welding the plug mounted in the opening portion to the fabricated object. According to such a manufacturing method, it is possible to first discharge unsolidified metal powder remaining in the internal space and then close the opening portion by welding the plug mounted in the opening portion to the fabricated object.

SUMMARY

However, the manufacturing method described in JP 2021-161460 A has the following problems. That is, the manufacturing method requires the work of welding the plug to the fabricated object after sintering the fabricated object, and thus the plug cannot be welded to the fabricated object before sintered. In addition, since the work of welding the plug to the fabricated object is newly generated, the manufacturing method may result in higher manufacturing costs and a larger number of manufacturing processes.

The present disclosure has been made in view of the foregoing, and provides a method for manufacturing an additively manufactured object, capable of easily closing an opening portion with a plug by sintering, without requiring a welding work.

A method for manufacturing an additively manufactured object according to the present disclosure includes: forming a precursor of an additively manufactured object having an opening portion that communicates with a hollow internal space, by jetting a liquid binder onto a powder layer to form solidified layers and stacking the formed solidified layers; forming a plug configured to be assembled with the opening portion; removing unsolidified powder remaining in the internal space of the precursor from the opening portion to an outside of the precursor; applying the liquid binder to at least one of an inner peripheral wall of the opening portion or an outer peripheral wall of the plug after removing the unsolidified powder; assembling the plug with the opening portion such that the inner peripheral wall of the opening portion comes into contact with the outer peripheral wall of the plug; and sintering the precursor having the plug assembled with the opening portion.

The method for manufacturing an additively manufactured object according to the present disclosure removes the unsolidified powder remaining in the internal space from the opening portion, applies the liquid binder to at least one of the inner peripheral wall of the opening portion or the outer peripheral wall of the plug, and then assembles the plug with the opening portion such that the inner peripheral wall of the opening portion comes into contact with the outer peripheral wall of the plug, followed by sintering the precursor. Through such steps, it is possible to easily close the opening portion with the plug by sintering, without requiring a welding work.

In some embodiments, in the applying the liquid binder, alcohol is first applied to at least one of the inner peripheral wall of the opening portion or the outer peripheral wall of the plug, and then the liquid binder is applied. Since such a process can prevent the applied liquid binder from drying, it is possible to obtain the effect of enhancing the bond strength between the plug and the precursor.

According to the present disclosure, it is possible to easily close the opening portion with the plug by sintering, without requiring a welding work.

DETAILED DESCRIPTION

Figure 1:
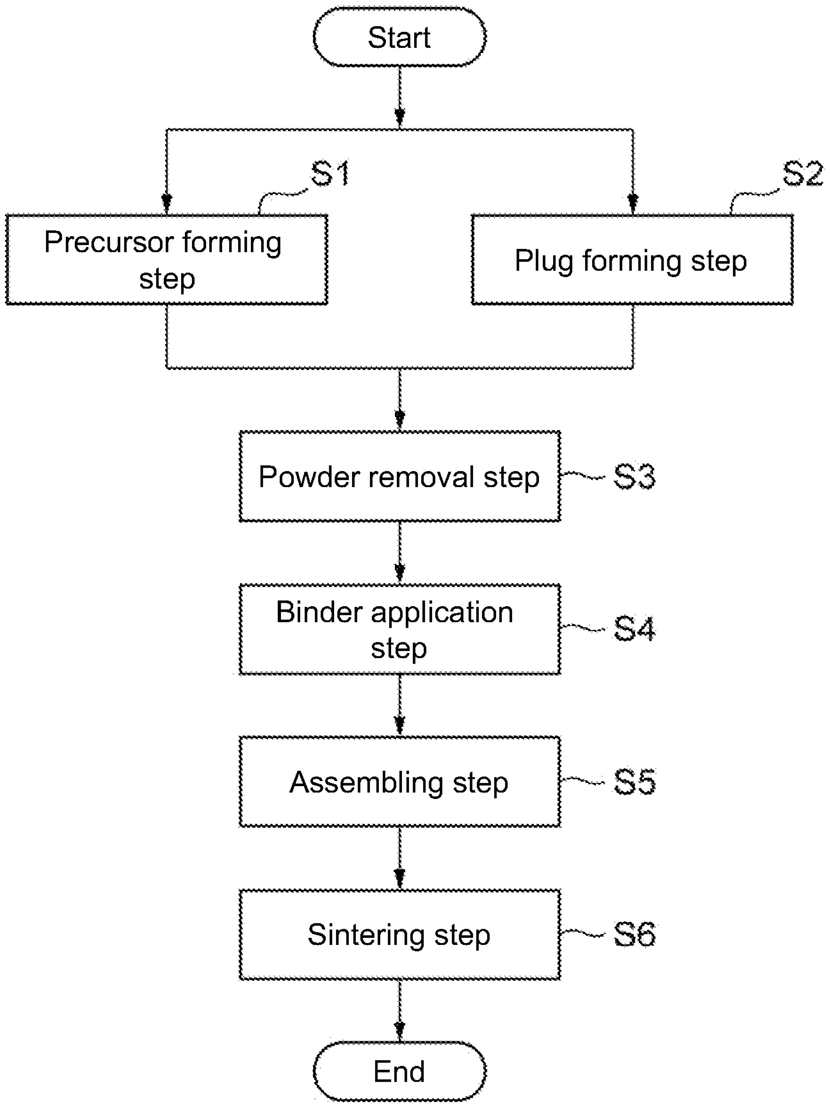
FIG. 1 is a flowchart of a method for manufacturing an additively manufactured object according to an embodiment.

Hereinafter, an embodiment of a method for manufacturing an additively manufactured object according to the present disclosure will be described with reference to the drawings. In the following description, directional terms, such as upper, lower, left, right, front, and rear, are used for convenience in describing the states shown in the drawings, and these terms do not limit the manufacturing method. In addition, to avoid complication of description, the term "additively manufactured object" may be simply referred to as an "object."

FIG. 1 is a flowchart of a method for manufacturing an additively manufactured object according to an embodiment. The method for manufacturing an additively manufactured object according to the present embodiment is a method for manufacturing an additively manufactured object having an three-dimensional internal space using binder jetting technology. This method for manufacturing an additively manufactured object includes a precursor forming step S1, a plug forming step S2, a powder removal step S3, a binder application step S4, an assembling step S5, and a sintering step S6.

The precursor forming step S1 and the plug forming step S2 are steps that are independent of each other and may be performed simultaneously. Either step may be performed before the other, but an example of performing the steps simultaneously will be described in the present embodiment. In addition, the plug forming step S2 only need be completed before the binder application step S4 starts. For example, the plug forming step S2 may be performed after the powder removal step S3. Alternatively, the plug forming step S2 and the powder removal step S3 may be performed simultaneously.

In the precursor forming step S1, a liquid binder is jetted onto a powder layer to form solidified layers, and the formed solidified layers are stacked, thereby forming a precursor of an object having an opening portion that communicates with a hollow internal space. Specifically, a powder layer having a desired thickness is formed by evenly spreading powder made from, for example, resin, plaster, sand, metal, and the like, and then a liquid binder is selectively jetted onto the formed powder layer. This binds together and solidifies the powder particles of the powder layer in an area corresponding to the jetted liquid binder, and forms a first solidified layer. Meanwhile, the powder of the powder layer in an area without the jetted liquid binder remains unsolidified.

The liquid binder is not particularly limited as long as it has a viscosity or adhesion that makes powder particles bonded together. In one example, examples of the solvent of the liquid binder include water, alcohols, ketones, carboxylate esters, and the like, and the solvent may be a mixture containing at least one of them. Examples of the solute of the liquid binder include a fatty acid, a paraffin wax, a microcrystalline wax, polyethylene, polypropylene, polystyrene, an acrylic resin, a polyamide resin, polyester, stearic acid, polyvinyl pyrrolidone (PVP), polyvinyl alcohol (PVA), polyethylene glycol (PEG), and the like. The liquid binder containing such a solvent and solute may be selected depending on the type, properties, and the like of the powder used.

Next, through the same process, second, third, . . . and nth solidified layers are successively formed and stacked, thereby forming a precursor (also referred to as a green part) of an object.

Figure 2:
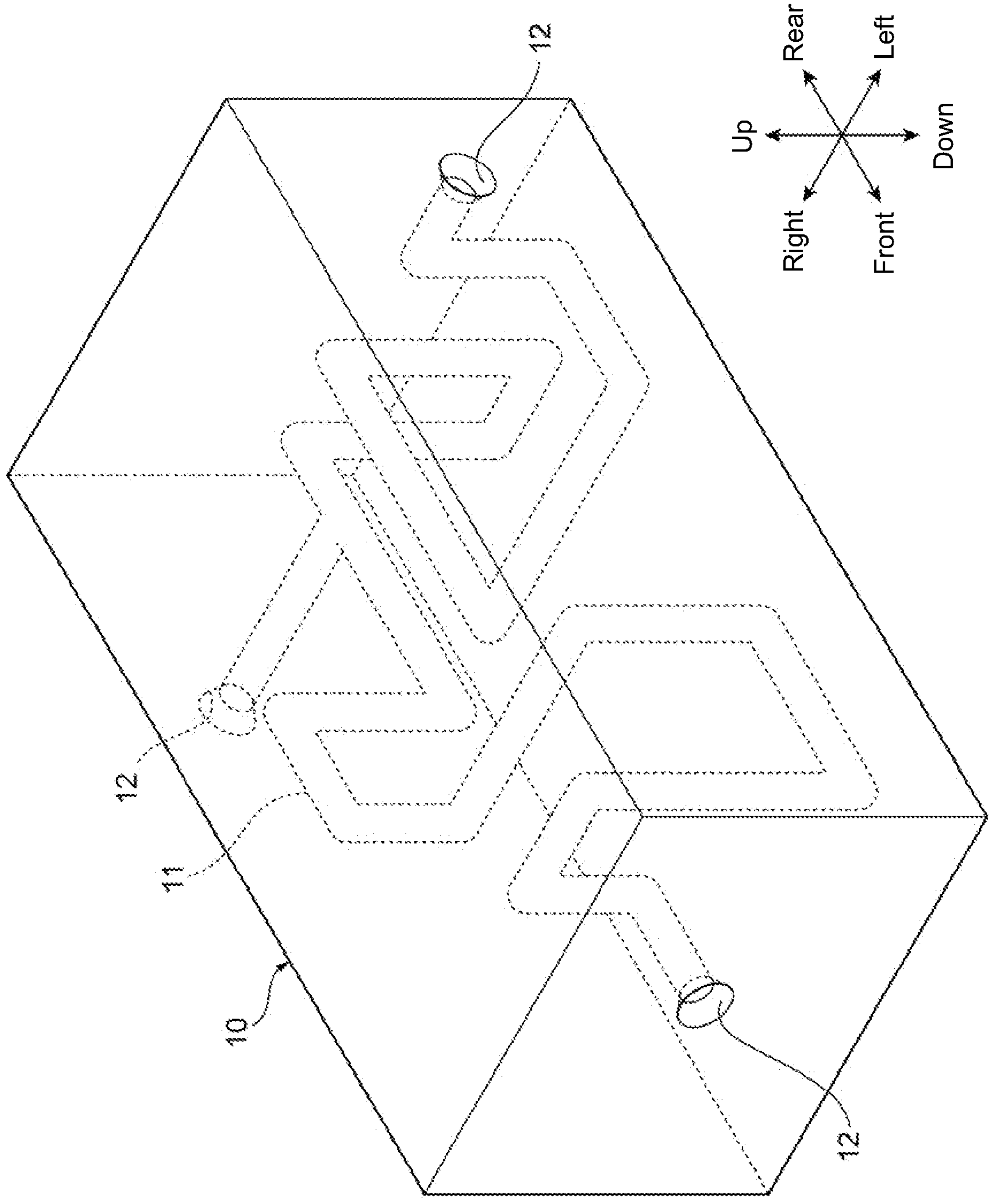
FIG. 2 is a perspective view of one example of a precursor of an object.

The precursor of the object is a three-dimensional object as shown in FIG. 2, for example. A precursor 10, as shown in FIG. 2, is a rectangular parallelepiped, for example, and has a hollow internal space 11 formed therein. The internal space 11 is in the form of a thin tube, for example, and extends while meandering in the front and rear, left and right, and upper and lower directions of the precursor 10 and has a complicated shape. In addition, the internal space 11 includes many portions where the direction of extension relatively steeply changes (for example, a bending angle of 90° or more).

The outer walls of the precursor 10 include a plurality of opening portions 12 that communicates with the internal space 11. The positions and the number of opening portions 12 formed are not particularly limited, and the opening portions 12 may be arranged such that unsolidified powder remaining in the internal space 11 can be removed smoothly to the outside of the precursor 10. For example, when the unsolidified powder remaining in the internal space 11 is hard to remove, the opening portion 12 that communicates with the internal space 11 may be formed on each of the front, rear, left, right, upper, and lower outer walls of the precursor 10.

Figure 3:
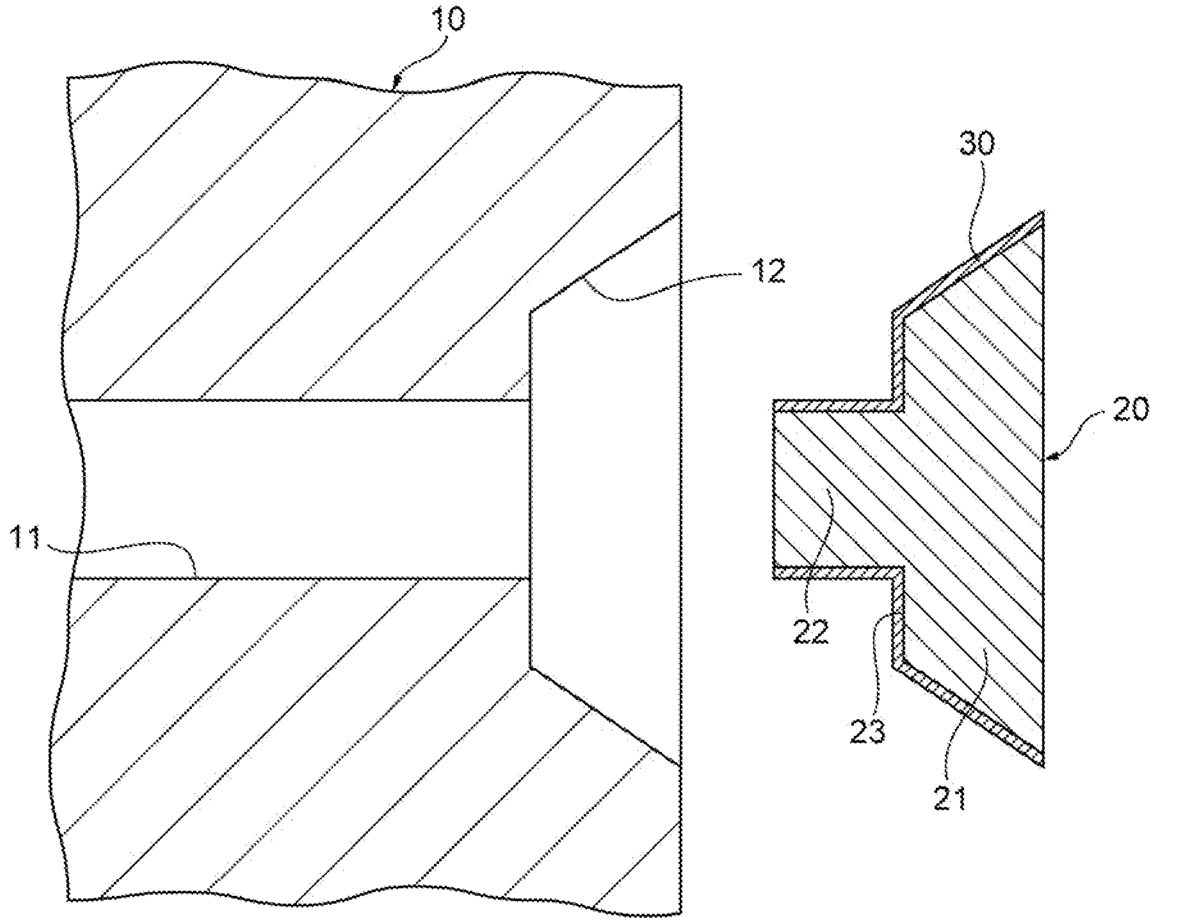
FIG. 3 is a schematic cross-sectional view for explaining the method for manufacturing an additively manufactured object.

The opening portion 12, as shown in FIG. 3, is in the form of a truncated cone in the cross section, for example, and has a diameter that expands from the inside toward the outside of the precursor 10. That is, the opening portion 12 is formed such that its smallest end face faces the internal space 11. In addition, the smallest end face of the opening portion 12 has a diameter larger than the diameter of the internal space 11.

In the plug forming step S2, a plug 20 configured to be assembled with the opening portion 12 of the precursor 10 is formed. The plug 20, as shown in FIG. 3 for example, includes a flange portion 21 having a truncated cone shape, and a cylindrical insertion portion 22 formed integrally with the flange portion 21. The flange portion 21 is formed slightly smaller than the opening portion 12 so as to fit in the shape of the opening portion 12. The insertion portion 22 is disposed coaxially with the flange portion 21, and projects from the smallest end face of the flange portion 21. This insertion portion 22 has a diameter that allows insertion into the internal space 11.

As shown in FIG. 3, the insertion portion 22 has a diameter smaller than the diameter of the smallest end face of the flange portion 21. Thus, a step portion 23 is formed between the flange portion 21 and the insertion portion 22. The plug 20 is made from the same material as the precursor 10. The plug 20 may be formed using binder jetting technology, like the precursor 10, or may be formed by a different method.

Although the plug 20 according to the present embodiment includes the insertion portion 22 and the flange portion 21, the plug 20 may include only the flange portion 21. Furthermore, the shape of the plug 20 is not limited to the aforementioned example, and the plug 20 may have a truncated pyramid shape or a cylindrical shape.

The powder removal step S3 following the precursor forming step S1 and the plug forming step S2 is a so-called “de-powdering” process. In this powder removal step S3, unsolidified powder remaining in the internal space 11 of the precursor 10 is removed from the opening portion 12 to the outside of the precursor 10. Specifically, through tube pressure-feeding and/or tube suction, the unsolidified powder in the internal space 11 is removed via the opening portion 12.

In the binder application step S4 following the powder removal step S3, a liquid binder is applied to at least one of the inner peripheral wall of the opening portion 12 of the precursor 10 or the outer peripheral wall of the plug 20. As shown in FIG. 3 for example, a liquid binder 30, which is the same as the one used in the precursor forming step S1, is applied to the outer peripheral wall of the flange portion 21 and the outer peripheral wall of the insertion portion 22 of the plug 20. At this time, the liquid binder 30 may be applied also to the inner peripheral wall of the opening portion 12. This can enhance the bond strength between the plug 20 and the precursor 10.

It should be noted that, instead of being applied to the outer peripheral wall of the plug 20, the liquid binder may be applied to the inner peripheral wall of the opening portion 12. At this time, the liquid binder may be applied also to the inner peripheral wall of the internal space 11 that comes into contact with the outer peripheral wall of the insertion portion 22 of the plug 20 in the assembled state of the plug 20. This can enhance the bond strength between the plug 20 and the precursor 10.

Figure 4:
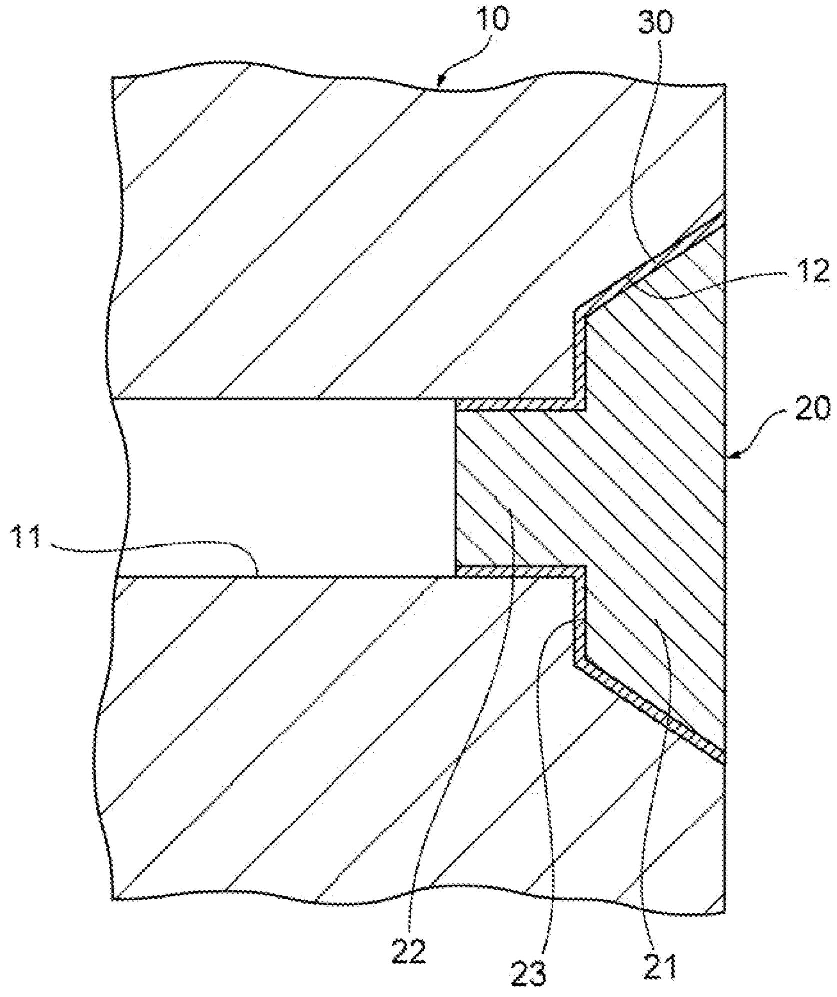
FIG. 4 is a schematic cross-sectional view for explaining the method for manufacturing an additively manufactured object.

In the assembling step S5 following the binder application step S4, the plug 20 is assembled with the opening portion 12 of the precursor 10 such that the inner peripheral wall of the opening portion 12 comes into contact with the outer peripheral wall of the plug 20. Specifically, as shown in FIG. 4, the plug 20 having the liquid binder 30 applied thereto is inserted into the opening portion 12 of the precursor 10 such that the step portion 23 of the plug 20 abuts on the smallest end face of the opening portion 12. Once the step portion 23 of the plug 20 abuts on the smallest end face of the opening portion 12, the outer peripheral wall of the insertion portion 22 of the plug 20 comes into contact with a part of the inner peripheral wall of the internal space 11, and the outer peripheral wall of the flange portion 21 of the plug 20 comes into contact with the inner peripheral wall of the opening portion 12. In this way, the plug 20 is assembled with the opening portion 12 of the precursor 10.

In the sintering step S6 following the assembling step S5, the precursor 10 having the plug 20 assembled with the opening portion 12 is sintered. Specifically, the precursor 10 having the plug 20 assembled with the opening portion 12 is placed in a sintering furnace or the like and sintered at a predetermined temperature (e.g., 900° C.) for a predetermined time (e.g., 3 hours). Examples of the heating atmosphere during sintering include air atmosphere, inert gas atmosphere, reduced-pressure atmosphere, or the like.

Figure 5:
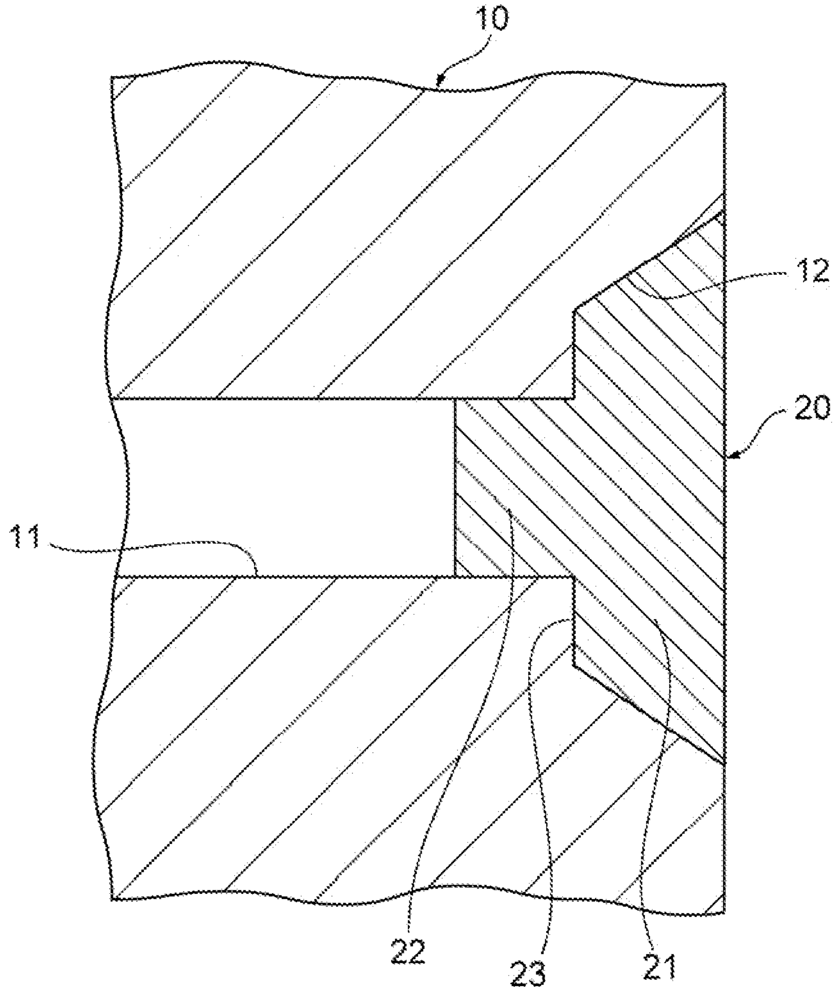
FIG. 5 is a schematic cross-sectional view for explaining the method for manufacturing an additively manufactured object.

Such sintering causes the powder of the precursor 10 to be solidified, and enhances the strength of the precursor 10. Through the sintering, the plug 20 is shrink fitted to the precursor 10 and integrated with the precursor 10. Accordingly, the opening portion 12 of the precursor 10 is closed by the plug 20 (see FIG. 5).

Through the above-described steps, an object having the internal space 11 is manufactured.

The method for manufacturing an additively manufactured object according to the present embodiment removes the unsolidified powder remaining in the internal space 11 of the precursor 10 from the opening portion 12 of the precursor 10, applies the liquid binder 30 to the outer peripheral wall of the plug 20, and then assembles the plug 20 with the opening portion 12 such that the inner peripheral wall of the opening portion 12 comes into contact with the outer peripheral wall of the plug 20, followed by sintering the precursor 10. Through such steps, it is possible to easily close the opening portion 12 of the precursor 10 with the plug 20 by sintering, without requiring a welding work. In addition, by omitting the conventional welding work, it is possible to obtain the effect of reducing the manufacturing costs and the number of manufacturing processes.

It should be noted that in the sintering step S6 of the present embodiment, the precursor 10 having the plug 20 assembled with the opening portion 12 may be subjected to degreasing treatment prior to sintering. With such a process, it is possible to reduce the occurrence of imperfect sintering because of the remaining liquid binder 30.

In addition, in the binder application step S4, alcohol may be first applied to at least one of the inner peripheral wall of the opening portion 12 or the outer peripheral wall of the plug 20, and then the liquid binder may be applied. Since such a process can prevent the applied liquid binder from drying, it is possible to obtain the effect of enhancing the bond strength between the plug 20 and the precursor 10.

Although the embodiment of the present disclosure has been described in detail above, the present disclosure is not limited to the above embodiment, and various design changes are possible in so far as they are within the spirit of the present disclosure in the scope of the claims.

The invention claimed is:

1. A method for manufacturing an additively manufactured object, comprising:

forming a precursor of an additively manufactured object having a hollow internal space with at least a first opening portion and a second opening portion, wherein the hollow internal space is a passage in the form of a tube extending through the precursor, the first opening portion and the second opening portion being disposed at different outer walls of the precursor at respective ends of the tube, by jetting a liquid binder onto a powder layer to form solidified layers and stacking the formed solidified layers;

forming a plug configured to be assembled with each of the first opening portion and the second opening portion;

removing unsolidified powder remaining in the internal space of the precursor from each of the first opening portion and the second opening portion to an outside of the precursor;

applying the liquid binder to at least one of an inner peripheral wall of the first opening portion or an outer peripheral wall of the plug after removing the unsolidified powder;

assembling the plug with the first opening portion such that the inner peripheral wall of the first opening portion comes into contact with the outer peripheral wall of the plug; and sintering the precursor having the plug assembled with the first opening portion, wherein in the forming the plug, the plug is formed to include a flange portion configured to close the first opening portion and an insertion portion configured to be inserted into the internal space, and in the assembling the plug with the first opening portion, the plug is assembled with the first opening portion such that an outer peripheral wall of the flange portion comes into contact with the inner peripheral wall of the first opening portion so that the flange portion closes the first opening portion and the insertion portion is inserted into the internal space, wherein in the forming the plug, the flange portion has a truncated shape, and the insertion portion has a cylindrical shape formed coaxially with the flange portion.

2. The method for manufacturing an additively manufactured object according to claim 1, wherein in the applying the liquid binder, alcohol is first applied to at least one of the inner peripheral wall of the first opening portion or the outer peripheral wall of the plug, and then the liquid binder is applied.

3. The method for manufacturing an additively manufactured object according to claim 1, wherein a step portion is formed between the insertion portion and the flange portion.

4. The method for manufacturing an additively manufactured object according to claim 3, wherein the inner peripheral wall of the first opening portion has a truncated shape and a smallest diameter of the truncated shape is larger than a diameter of the insertion portion, so that in the assembling the plug with the opening portion, the step portion abuts with an end face of the opening portion.

* * * * *